(12) United States Patent
Leone et al.

(10) Patent No.: US 9,512,797 B2
(45) Date of Patent: *Dec. 6, 2016

(54) METHOD AND SYSTEM FOR IMPROVING ENGINE STARTING

(71) Applicant: Ford Global Technologies, LLC, Dearborn, MI (US)

(72) Inventors: Thomas G. Leone, Ypsilanti, MI (US); Ross Dykstra Pursifull, Dearborn, MI (US); Joseph Norman Ulrey, Dearborn, MI (US); Donald J. Lewis, Bath Springs, TN (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/558,577

(22) Filed: Dec. 2, 2014

(65) Prior Publication Data
US 2015/0083086 A1 Mar. 26, 2015

Related U.S. Application Data

(63) Continuation of application No. 13/326,150, filed on Dec. 14, 2011, now Pat. No. 8,899,212.

(51) Int. Cl.
*F02D 41/06* (2006.01)
*F02N 19/00* (2010.01)
(Continued)

(52) U.S. Cl.
CPC .............. *F02D 41/062* (2013.01); *F02D 9/02* (2013.01); *F02D 13/0261* (2013.01);
(Continued)

(58) Field of Classification Search
CPC F02D 41/062; F02D 13/0261; F02D 41/0002; F02D 41/008; F02D 19/084; F02D 9/02; F02D 41/0025; F02D 13/0265; F02D 2009/0272; F02D 2009/0249; F02N 19/00; Y02T 10/36; Y02T 10/42
(Continued)

(56) References Cited

U.S. PATENT DOCUMENTS 4,448,158 A * 5/1984 Ishida ..................... F02M 1/10
123/179.15
5,377,650 A * 1/1995 Warner ..................... F01N 3/22
123/568.29
(Continued)

FOREIGN PATENT DOCUMENTS

EP 0573895 A1 12/1993
EP 1306829 A2 5/2003
(Continued)

OTHER PUBLICATIONS

Kapus, P.E. et al., "Ethanol Direct Injection on Turbocharged SI Engines—Potential and Challenges," SAE Technical Paper Series 011408, World Congress, Detroit, MI., Apr. 16-19, 2007, 11 pages.
(Continued)

*Primary Examiner* — Joseph Dallo
(74) *Attorney, Agent, or Firm* — Julia Voutyras; Alleman Hall McCoy Russell & Tuttle LLP

(57) ABSTRACT

An engine system and method for improving engine starting are disclosed. In one example, engine port throttles are adjusted to improve fuel vaporization of a fuel that includes alcohol. The system and method may improve engine starting and emissions.

20 Claims, 9 Drawing Sheets

(51) Int. Cl.
*F02D 41/00* (2006.01)
*F02D 9/02* (2006.01)
*F02D 19/08* (2006.01)
*F02D 13/02* (2006.01)

(52) U.S. Cl.
CPC ....... *F02D 19/084* (2013.01); *F02D 41/0002* (2013.01); *F02D 41/008* (2013.01); *F02D 41/0025* (2013.01); *F02N 19/00* (2013.01); *F02D 13/0265* (2013.01); *F02D 2009/0249* (2013.01); *F02D 2009/0272* (2013.01); *Y02T 10/36* (2013.01); *Y02T 10/42* (2013.01)

(58) Field of Classification Search
USPC .................. 123/179.3, 179.5, 336, 366, 442, 491,123/576; 701/103–105
See application file for complete search history.

(56) References Cited

U.S. PATENT DOCUMENTS

| | | | |
|---|---|---|---|
| 5,542,388 A * | 8/1996 | Ichinose | F02B 31/085 123/179.18 |
| 5,596,957 A * | 1/1997 | Ichinose | F02B 29/02 123/179.18 |
| 5,632,249 A * | 5/1997 | Sadakane | F02D 9/02 123/336 |
| 5,722,365 A * | 3/1998 | Sadakane | F02D 41/10 123/336 |
| 6,543,220 B2 * | 4/2003 | Yoshida | F02D 41/042 60/274 |
| 6,622,486 B2 * | 9/2003 | Jarvi | F02B 75/22 123/184.57 |
| 6,675,768 B2 * | 1/2004 | Kanai | F02D 11/107 123/336 |
| 6,915,788 B2 * | 7/2005 | Nakamura | F02D 41/18 123/184.53 |
| 7,093,426 B2 * | 8/2006 | Ichihara | F02D 9/02 60/274 |
| 7,347,183 B2 * | 3/2008 | Tabata | F02B 29/083 123/336 |
| 8,176,894 B2 * | 5/2012 | Ulrey | F02D 11/02 123/336 |
| 8,371,266 B1 * | 2/2013 | Ulrey | F02D 11/02 123/336 |
| 8,776,754 B2 | 7/2014 | Lewis et al. | |
| 2003/0217739 A1 * | 11/2003 | Saeki | F02D 9/1015 123/543 |
| 2004/0016416 A1 * | 1/2004 | Ichihara | F02D 9/02 123/302 |
| 2004/0237931 A1 * | 12/2004 | Okamoto | F02B 27/0284 123/308 |
| 2006/0254564 A1 * | 11/2006 | Lewis | F01L 9/04 123/491 |
| 2008/0184705 A1 * | 8/2008 | Dumas | F02B 33/44 60/611 |
| 2012/0024261 A1 * | 2/2012 | Ulrey | F02D 11/02 123/336 |
| 2013/0066535 A1 | 3/2013 | Leone et al. | |
| 2013/0066539 A1 | 3/2013 | Leone et al. | |
| 2013/0111901 A1 | 5/2013 | Leone et al. | |

FOREIGN PATENT DOCUMENTS

EP 1382826 A2 1/2004
JP 8109836 A 4/1996

OTHER PUBLICATIONS

Colpin, C. et al., "Key Parameters for Startability Improvement Applied to Ethanol Engines," SAE Technical Paper Series No. 010616, Renault SAS, 2009, 9 pages.
Nakajima, Susumu, "Research into Optimal Specifications for Flexible Fuel Vehicle Engines," SAE Technical Paper Series No. 011097, Honda R&D Co., Ltd, 2010, 10 pages.
Colli, Gustavo Beira et al., "Heated Injector Cold Start System for Flex-Fuel Motorcycles," SAE Technical Paper Series No. 360156, Congresso 2010 SAE Brasil, São Paulo, Brasil, Oct. 5-7, 2010, 19 pages.
Anonymous, "Cylinder Disablement," IPCOM No. 000157650, Published Aug. 30, 2007, 2 pages.
Anonymous, "A Low Emission Engine Starting Strategy for Start/Stops," IPCOM No. 000240460, Published Jan. 30, 2015, 2 pages.
Partial Translation of Office Action of Chinese Application No. 2012105446908, Issued Feb. 1, 2016, State Intellectual Property Office of PRC, 8 Pages.

* cited by examiner

METHOD AND SYSTEM FOR IMPROVING ENGINE STARTING

CROSS REFERENCE TO RELATED APPLICATIONS

The present application is a continuation of U.S. patent application Ser. No. 13/326,150, entitled "METHOD AND SYSTEM FOR IMPROVING ENGINE STARTING," filed Dec. 14, 2011, now U.S. Pat. No. 8,899,212, the entire contents of which are hereby incorporated by reference for all purposes.

BACKGROUND/SUMMARY

Starting an engine with a fuel that includes alcohol may be difficult at lower temperatures because it may be difficult to vaporize the alcohol and facilitate combustion. One way to improve vaporization of a fuel that includes alcohol is to heat the fuel before the fuel is injected to the engine. However, it may be difficult to provide enough heat to the fuel in a timely manner such that the fuel vaporizes when injected to a cylinder. Specifically, it may be difficult to heat fuel to a temperature that allows vaporization of the fuel in the time between combustion events. Therefore, it may be desirable to provide a way to start an engine with a fuel that includes alcohol that does not include heating the fuel.

The inventors herein have recognized the above-mentioned limitations and have developed a method of starting an engine, comprising: substantially closing a port throttle of a cylinder; and injecting at least a portion of an amount of fuel to a cylinder during a cylinder cycle while the port throttle is substantially closed, the amount of fuel injected being during an interval that includes a middle position which is substantially aligned with a predetermined vacuum level of the cylinder.

By closing a cylinder port throttle and creating vacuum in a cylinder, it may be possible to improve starting an engine with a fuel that includes alcohol. Specifically, a cylinder port throttle may be closed during an intake stroke of a cylinder so that a vacuum level is provided in the cylinder that is greater than a vacuum in the cylinder when the cylinder is not port throttled. Further, fuel may be injected to the cylinder when vacuum within the cylinder is at a high level to improve fuel vaporization. In one example, fuel is injected at a timing that is substantially symmetric about a predetermined vacuum level. The predetermined vacuum level may be a maximum vacuum level of the cylinder during the cylinder's present cycle. In some examples, the maximum vacuum level during the cylinder cycle may be estimated from a position of the engine. In this way, fuel injection timing is coordinated with cylinder port throttle position and piston position to improve fuel vaporization and engine starting.

The present description may provide several advantages. In particular, the approach may provide more robust engine starting at lower engine temperatures. In addition, the method may reduce engine starting emissions by improving fuel vaporization and starting. For example, improved fuel vaporization may reduce engine misfires during starting and thereby reduce hydrocarbon emissions. Additionally, the approach may be more cost effective as compared to other approaches since cylinder port throttles may be used for purposes other than engine starting. For example, port throttles may be useful for providing vacuum when intake manifold pressure is high.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
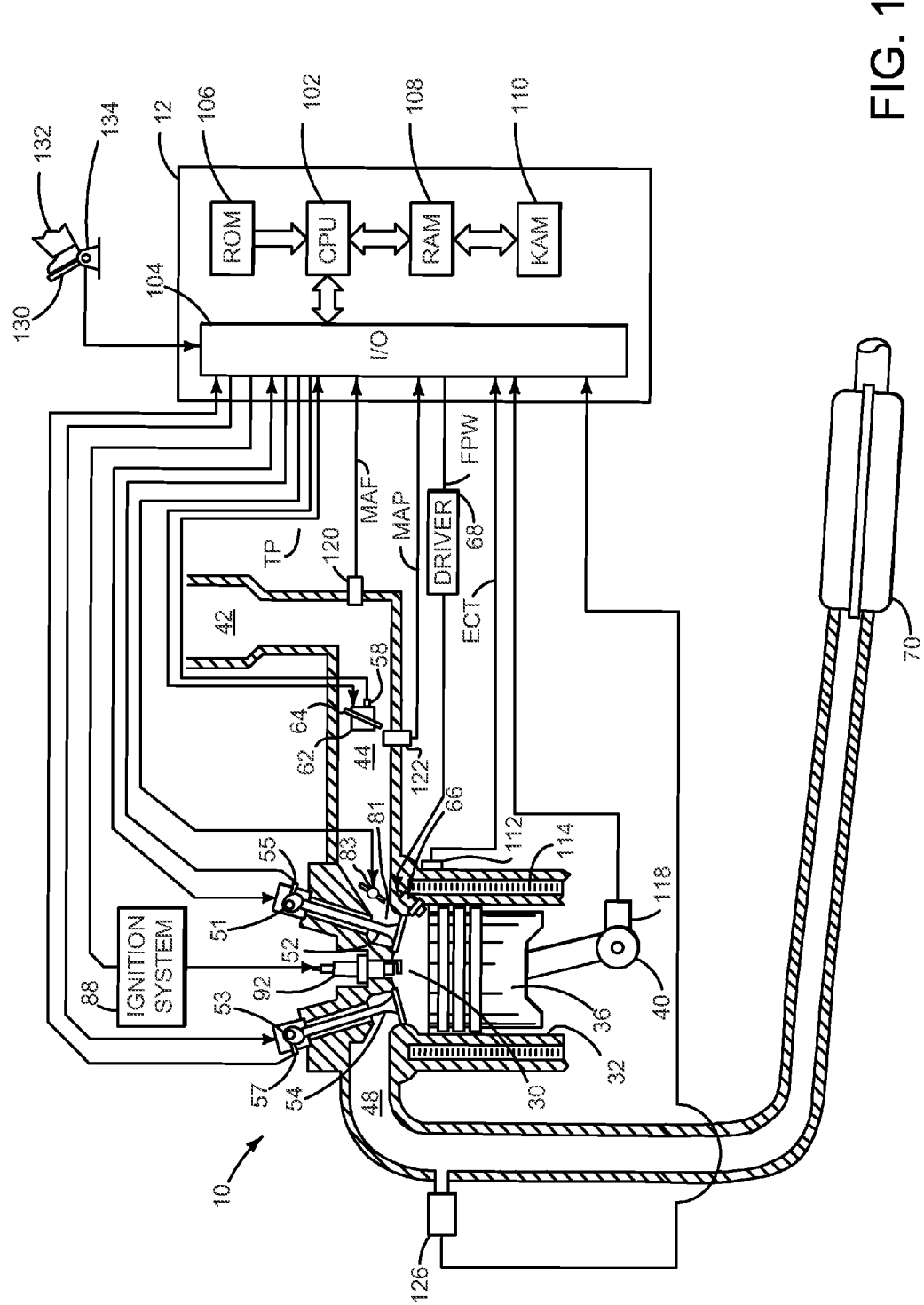
FIG. 1 shows a schematic depiction of an engine.
Figure 2:
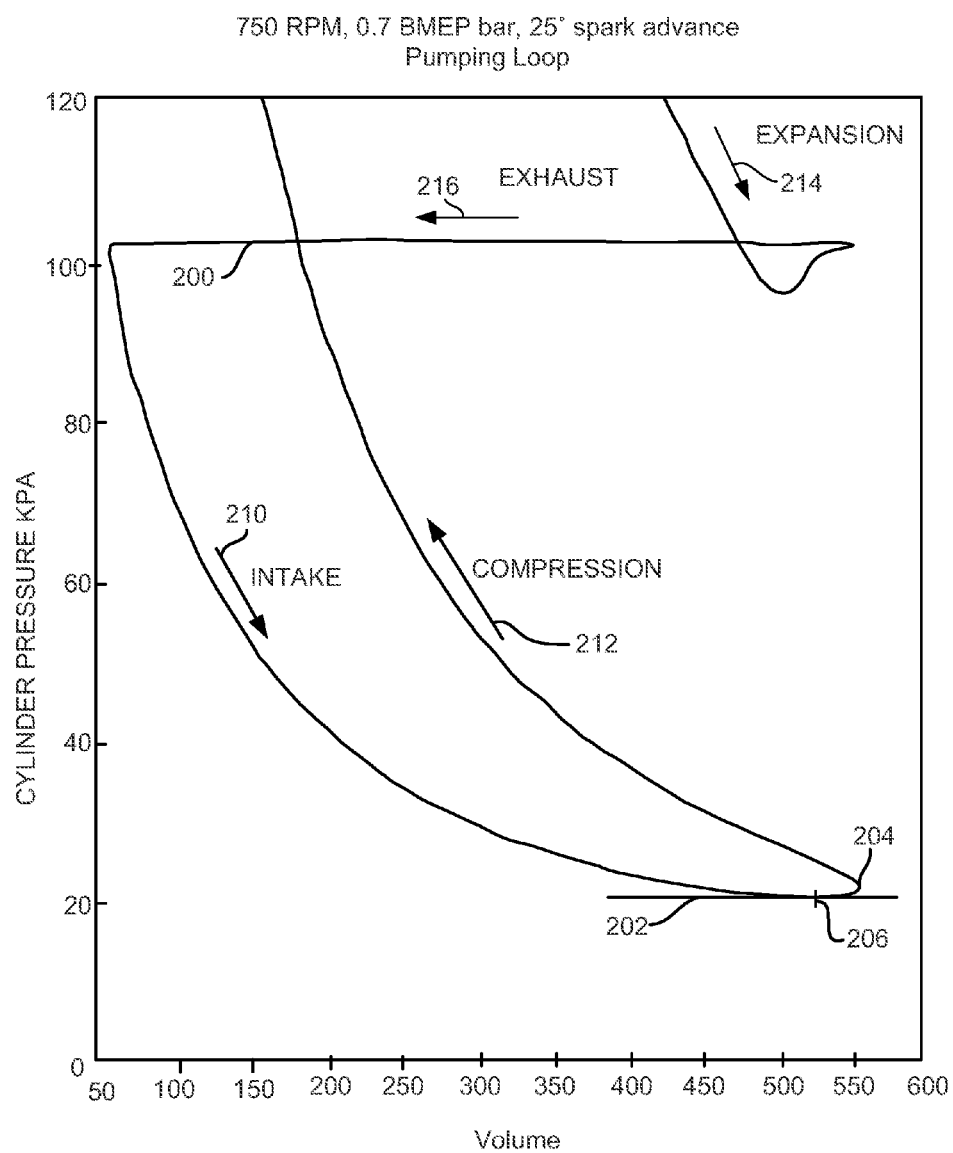
FIG. 2 shows a plot of example cylinder pressure.

The present description is related to controlling cylinder port throttles of an engine as illustrated in FIG. 1. An example plot of cylinder pressure is shown in FIG. 2 and it provides insight as to location of maximum vacuum within a cylinder during low engine speed conditions.

Figure 3:
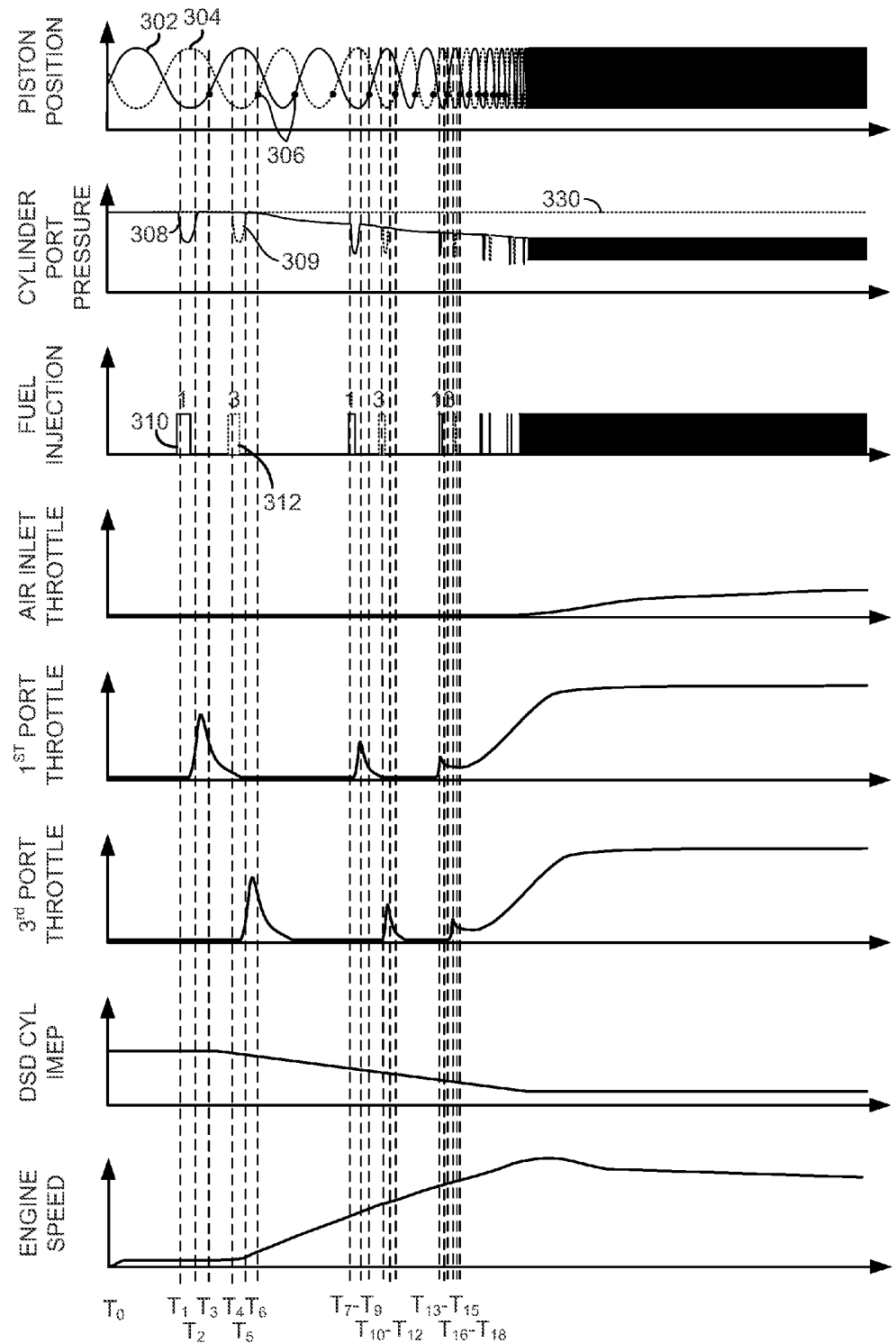
FIGS. 3 and 4 show example simulated engine starting sequences.
Figure 4:
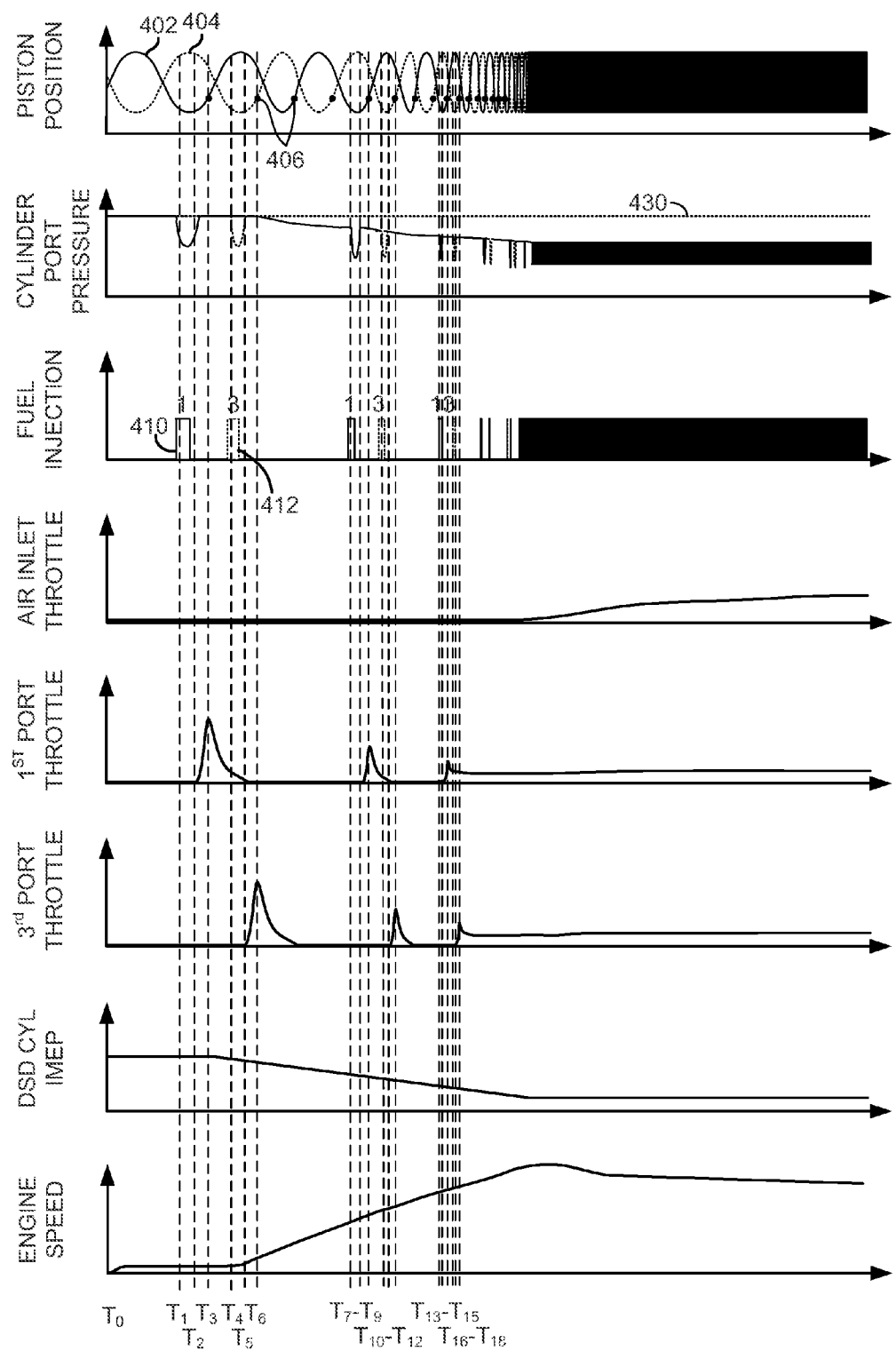
Figure 5:
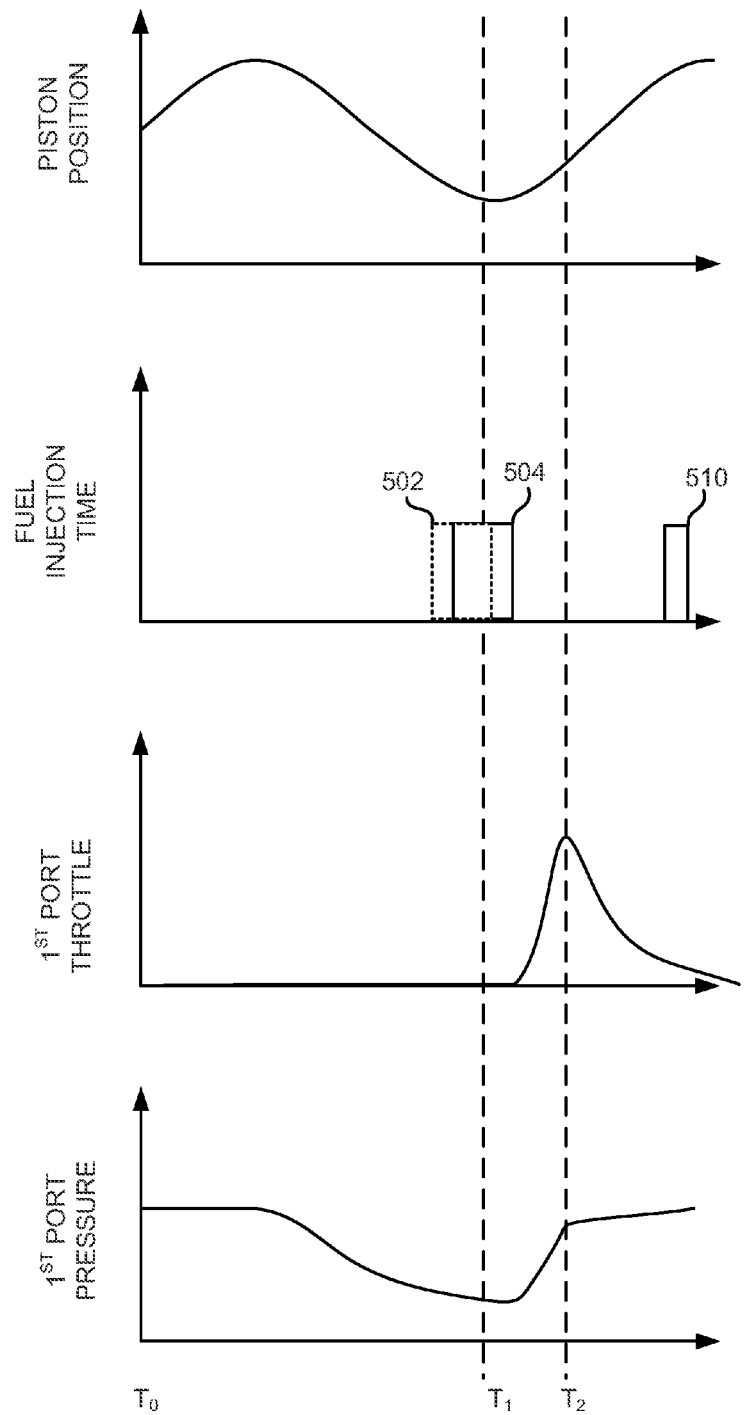
FIG. 5 shows a detailed view of a simulated example of engine fuel delivery and port throttle operating during a cycle of a cylinder.
Figure 6:
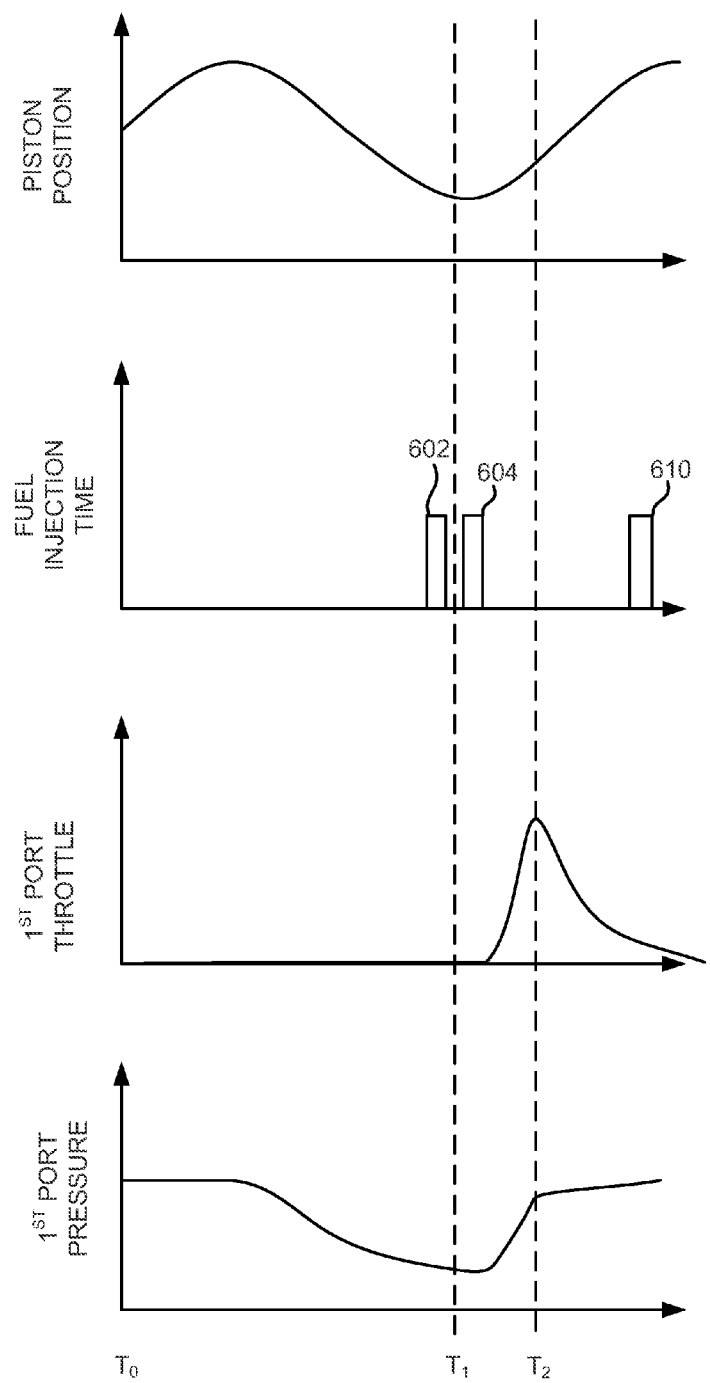
FIG. 6 shows a detailed view of a second simulated example of engine fuel delivery and port throttle operation during a cycle of a cylinder.
Figure 8:
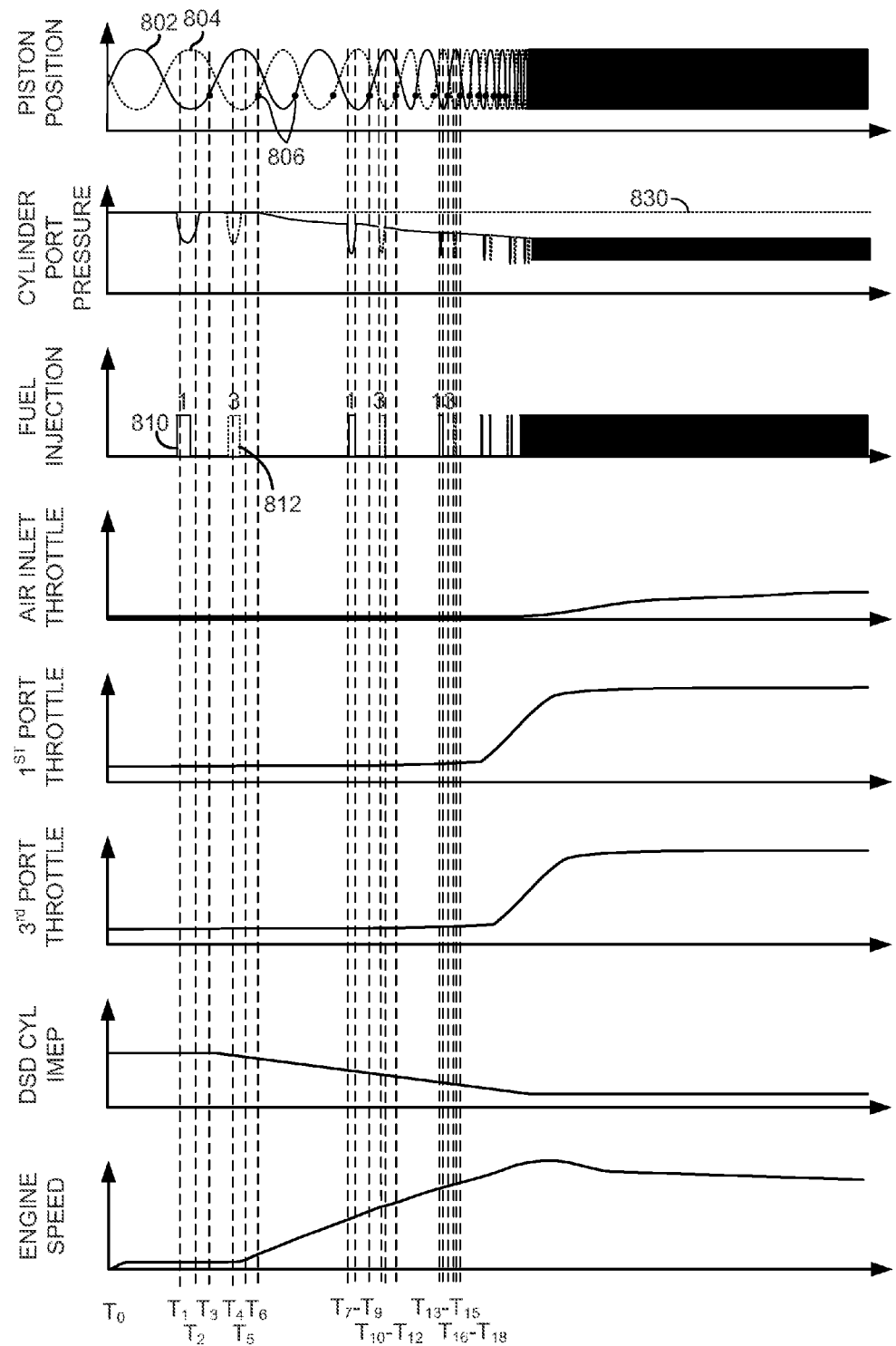
FIG. 8 shows an example simulated engine starting sequence.
Figure 9:
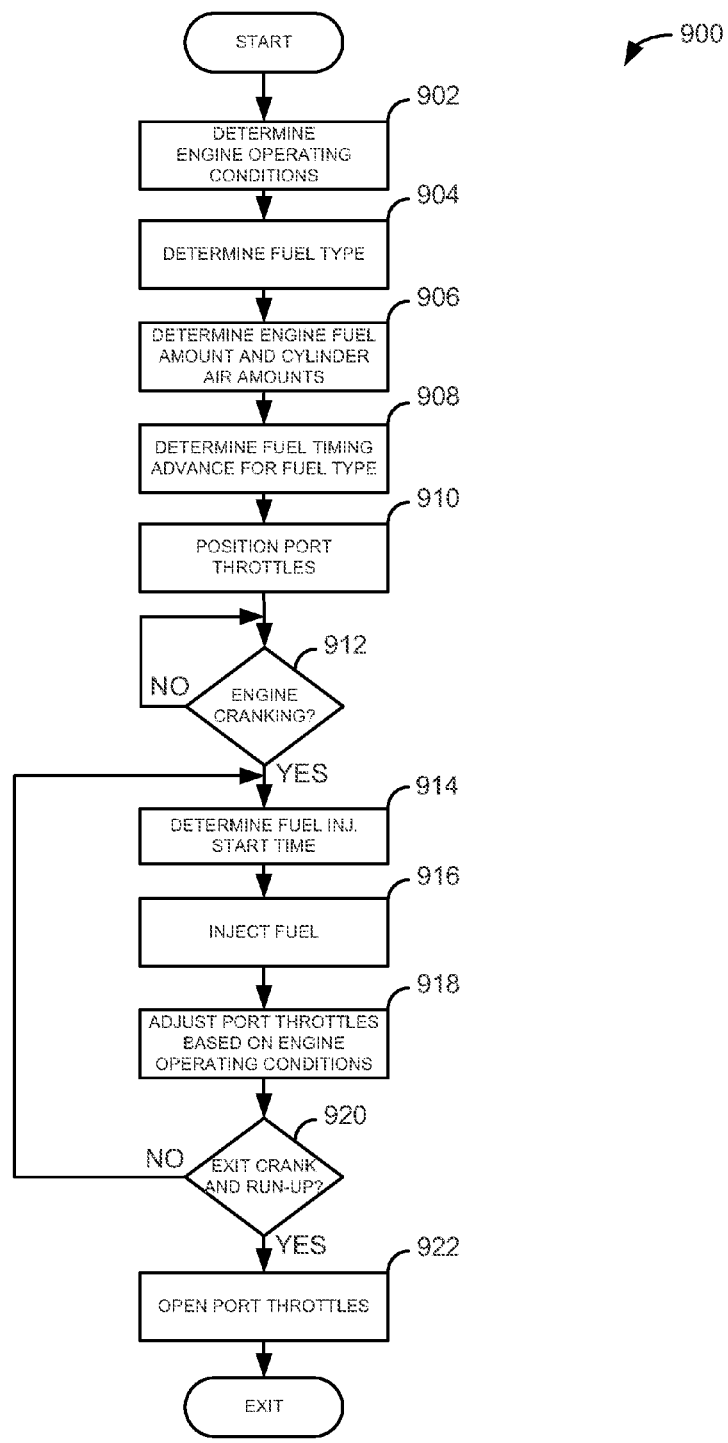
FIG. 9 shows a flowchart of a second example method for starting an engine.

In one example, multiple cylinder port throttles are individually adjusted to provide improved fuel vaporization during engine starting. FIGS. 3 and 4 show signals of interest during engine starting. FIGS. 5 and 6 provide detailed views of different fuel timings during engine starting. Cylinder port throttles may be controlled according to the method of FIG. 7 to provide the sequences illustrated in FIGS. 3-6. FIG. 8 shows an alternative engine starting sequence for a system where cylinder port throttles may be operated in unison. FIG. 9 is a flowchart of an alternative method for controlling cylinder port throttles.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. If the fuel is port injected the port injector is positioned between intake valve 52 and cylinder port throttle 83. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from engine air intake 42. Port throttle 83 controls air flow into cylinder 30 via restricting or opening cylinder intake port 81. In engines with a plurality of cylinders a plurality of individually controlled port throttles may be provided so that port throttle of a first cylinder may be positioned differently from port throttles of another cylinder. In other examples, each port throttle of a cylinder bank may be mechanically coupled to other port throttles of the cylinder bank such that the port throttles of the cylinder bank move in unison.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for an engine, comprising: an engine air intake throttle located along an engine air intake passage; a first engine cylinder port throttle located along the engine air intake passage downstream of the engine air intake throttle; a first fuel injector located downstream of the first engine cylinder port throttle; a cylinder receiving a fuel via the first fuel injector and air via the first engine cylinder port throttle; and a controller including instructions for injecting substantially a same amount of fuel before and after a predetermined vacuum level of the cylinder is reached during a cycle of the cylinder, and including additional instructions for opening the first engine cylinder port throttle after the first fuel injector begins to inject fuel during the cycle of the cylinder. In this way, fuel may be injected at times when fuel vaporization may be increased.

The system also includes where the first fuel injector is a direct fuel injector, and further comprising a second engine cylinder port throttle, and further comprising additional instructions for adjusting the second engine cylinder port throttle independent of the first engine cylinder port throttle. The system further comprises additional instructions for substantially fully opening the first engine cylinder port throttle after the engine reaches a predetermined engine speed. In some examples, the system includes where the same amount of fuel injected to the cylinder before and after the predetermined vacuum level is reached is injected in two separate pulses. The system further comprises addition instructions for substantially closing the first engine cylinder port throttle after an intake valve of the cylinder is closed during the cycle of the cylinder. The system further includes where the first fuel injector is a port fuel injector, and further comprising additional instructions to inject fuel to the cylinder via the port fuel injector while an intake valve of the cylinder is open.

Referring now to FIG. 2, an example plot of cylinder pressure for an engine operating at 750 RPM is shown. The X axis indicates cylinder volume and cylinder volume increases from left to right. The Y axis indicates cylinder pressure and pressure increases from the bottom to the top of the plot. Cylinder pressure is represented by curve 200.

Pressure in the cylinder follows the trajectory indicated by directional arrows 210, 212, 214, and 216 for respective intake, compression, expansion, and exhaust strokes. The cylinder volume increases as the piston moves toward bottom dead center intake stroke in the direction of arrow 210. Cylinder pressure reaches a minimum level indicated by horizontal line 202 shortly before the piston reaches bottom dead center intake stroke at 204. Fuel may be injected to the cylinder or a cylinder intake port such that the middle of the fuel injection interval is substantially centered on the minimum cylinder pressure indicated at 206. The cylinder pressure begins to increase and follow the trajectory indicated by arrow 212 after the piston travels past bottom dead center and enters the compression stroke.

Notice that the trajectory of cylinder pressure curve 200 has a shallower slope to the left of marker 206 and cylinder pressure rises more quickly to the right of marker 206. Therefore, in some examples, a portion of the fuel injection duration may be biased advanced (e.g., to the left of marker 206, during the intake stroke) when centering the fuel injection interval over the minimum cylinder pressure would place a portion of the injection interval in a higher pressure region of the cylinder pressure as compared to the injection interval on the other side of the middle point of the injection interval. For example, 60% of a fuel injection pulse during a cylinder cycle may be injected at a time to the left of marker 206 while the remaining 40% of the fuel injection pulse may be placed to the right of marker 206. In this way, the fuel injection pulse may be located such that the fuel injected during the injection interval is exposed to the lowest pressure in the cylinder over the duration of the injection interval.

The middle portion of a fuel injection interval may be substantially positioned at bottom dead center intake stroke when the middle portion of the fuel injector interval is within the period where the cylinder volume is within 20% of the maximum cylinder volume during the intake and/or compression stroke of the cylinder. In other examples, the middle portion of a fuel injection interval may be substantially positioned at bottom dead center intake stroke when the middle portion of the fuel injector interval is within the period where the cylinder volume is within 10% of the maximum cylinder volume during the intake and/or compression stroke of the cylinder. For example, the middle portion of the fuel injection interval may be positioned at marker 206 or where cylinder volume is at 500 and still be considered substantially positioned at bottom dead center intake stroke.

Referring now to FIG. 3, an example engine starting sequence is illustrated. The sequence may be provided by controller 12 executing instructions of the method described in FIG. 7 within the system shown in FIG. 1. The sequence is illustrative of an engine including an air inlet throttle and cylinder port throttles.

The first plot from the top of FIG. 3 represents trajectories of pistons in cylinders 1 and 4 of a four cylinder, four stroke engine, having a firing order of 1-3-4-2. Line 302 represents the position of the piston of cylinder number one while line 304 represents the position of the piston of cylinder number three. Each of the pistons is at top dead center when the trajectory is at the top of the sinusoid. Each of the pistons is at bottom dead center at the bottom of the sinusoid. Dots 306 represent timing of intake valve closing for each cylinder relative to the piston trajectory. Time begins at the left side of the plot and increases to the right side of the plot.

The second plot from the top of FIG. 3 represents cylinder intake port pressure for cylinder ports of cylinders number one and three. The solid line 308 represents cylinder port pressure for cylinder number one. The dotted line 309 represents cylinder port pressure for cylinder number three. The Y axis represents cylinder pressure and cylinder pressure increases in the direction of the Y axis arrow. The X axis represents time and time increases from the left side to right side of the plot. Horizontal line 330 represents atmospheric pressure. Thus, when cylinder intake port pressure is below horizontal line 330 vacuum exists in the cylinder port.

The third plot from the top of FIG. 3 represents fuel injection timing for cylinders one and three of the engine. Fuel injection for cylinder one is represented by solid line 310. Fuel injection for cylinder three is represented by dotted line 312. The Y axis represents when fuel is being injected. A fuel injection above the X axis indicates that fuel is injected at the illustrated time. The X axis represents time and time begins at the left side of the plot and increases to the right side of the plot. The numbers above the fuel pulses indicate into which cylinder the fuel is injected. Thus, the numbering follows the engine order of combustion.

The fourth plot from the top of FIG. 3 represents air inlet throttle position versus time. The Y axis represents air inlet throttle opening amount and the throttle opening amount increases in the direction of the Y axis arrow. The X axis represents time and time increases from the left side of the plot to the right side of the plot.

The fifth plot from the top of FIG. 3 represents position of a first port throttle that can regulate air flow to cylinder number one versus time. The Y axis represents port throttle opening amount and the port throttle opening amount increases in the direction of the Y axis arrow. The X axis represents time and time increases from the left side of the plot to the right side of the figure.

The sixth plot from the top of FIG. 3 represents position of a third port throttle that can regulate air flow to cylinder number three versus time. The Y axis represents port throttle opening amount and the port throttle opening amount increases in the direction of the Y axis arrow. The X axis represents time and time increases from the left side of the plot to the right side of the plot.

The seventh plot from the top of FIG. 3 represents a desired cylinder indicated mean effective pressure (IMEP) during a combustion process during a cylinder cycle. IMEP can be increased by increasing the amount of air and fuel inducted into the cylinder. The Y axis represents IMEP and IMEP increases in the direction of the Y axis arrow. The X axis represents time and time increases from the left side of the plot to the right side of the plot.

The eighth plot from the top of FIG. 2 represents engine speed versus time. The Y axis represents engine speed and engine speed increases in the direction of the Y axis arrow. The X axis represents time and time increases from the left side of the plot to the right side of the plot.

Vertical markers $T_0$-$T_{18}$ represent times of interest in the sequence. The sequence begins at time $T_0$ and proceeds in the direction of $T_{18}$.

At time $T_0$, the engine is stopped and fuel is not injected to the engine. The air inlet throttle is set to a substantially closed position as are the first and third port cylinder throttles. The desired cylinder IMEP value is commanded relatively high so that the engine may quickly accelerate from cranking speed to idle speed during the engine start. The piston for cylinder number one is stopped just prior to top dead center (TDC) exhaust stroke. The piston for cylinder number three is stopped just prior to bottom dead center (BDC) power stroke.

Between time $T_0$ and time $T_1$, the engine is cranked via a starter and the pistons start to move in the cylinders. Engine speed increases to crank speed (e.g., 250 RPM). As the engine rotates, the engine controller 12 judges how much fuel to inject to cylinders as well as how much air to allow in the cylinders. The engine controller also determines when to begin and end injection of fuel as well as spark timing. In some examples, engine position may be determined from camshaft and crankshaft position sensor during cranking In other examples, engine position may be stored in memory at the time the engine stops.

At time $T_1$, the piston for cylinder number one (e.g., see trajectory of line 302) approaches BDC intake stroke. The first injection of fuel since engine stop occurs at time $T_1$ where fuel is injected to cylinder number one. Fuel may be directly injected to the cylinder number one or into an intake port of cylinder number one. Fuel injection continues until time $T_2$. Thus, the fuel injection interval for the first injection of fuel into cylinder number one since engine stop is the time between time $T_1$ and $T_2$. Further, the amount of fuel injected is during an interval, and the interval includes a middle position which is substantially aligned with maximum cylinder port vacuum (minimum cylinder pressure) during a cylinder cycle or with bottom dead center intake stroke of the cylinder. In some examples, the fuel injection interval may be measured in crankshaft degrees. Notice that the fuel injection interval for cylinder number one is centered about the minimum pressure in cylinder number one intake port. For example, the same amount of fuel is injected to the cylinder before the piston substantially reaches minimum cylinder port pressure as after the cylinder port pressure begins to increase. In some examples, the injection time may be centered on bottom dead center intake stroke of the cylinder. In this example, fuel is injected in a single pulse width; however, in other examples fuel may be delivered to a cylinder in two or more separate pulses.

The first port throttle is held closed from time $T_0$ to time $T_2$ so that vacuum develops in cylinder number one as the volume of the cylinder increases. The vacuum in cylinder number one reaches a near maximum value when the piston of cylinder number one approaches BDC. Thus, injecting fuel to the cylinder where maximum vacuum occurs may improve vaporization of fuels such as alcohol. The first port throttle begins to open at time $T_2$. However, in other examples the first port throttle may begin before end of fuel injection. Opening the first port throttle allows air to enter the cylinder at a higher flow rate so that a desired amount of air may enter the cylinder. The desired amount of air may be based in the desired IMEP. The timing that the first port throttle is opened, and the amount the first port throttle is opened, controls the amount of air that enters the cylinder. Said another way, opening the port throttle after the injection but before intake valve closing (IVC), governs the air charge. Air charge is set by cylinder pressure at IVC. For many tens of degrees after IVC, the port throttle position has no influence over either fuel vaporization or air charge control. This lessens the engine synchronous port throttle control requirements. The intake valve closing time of cylinder number one at $T_3$, as indicated by the dot, determines when air flow into the cylinder stops. Thus, air flow into the cylinder is increased by opening the first port throttle. On the other hand, air flow into cylinder number one is stopped by closing the intake valve of cylinder number one. In this way, air flowing into the cylinder may be controlled by the first port throttle opening time and the intake valve closing time of cylinder number one.

It should be noted that at lower engine speeds, such as during cranking and at least a portion of engine run-up to idle speed, cylinder port throttles may be opened according to crankshaft position since engine speed is low and time between cylinder intake events is relatively long. Closing timing of the cylinder port throttles is less important because intake valve closing timing determines when air flow into cylinders stops. In this way, the dynamic demands of moving the cylinder port throttles may be reduced, yet the cylinder port throttles may meter air flow into engine cylinders. Further, the cylinder port throttles are angularly synchronized with the engine crankshaft position when engine speed is less than a threshold speed. For example, the cylinder port throttles may be opened at predetermined crankshaft timings during cranking and run-up.

Thus, fuel is injected to cylinder number one when vacuum in the cylinder port is high (e.g., when pressure in the port is low) during a cylinder cycle, and air is allowed to flow into the cylinder after the fuel is vaporized to provide a cylinder air amount that matches the fuel amount at a desired ratio (e.g., an air-fuel ratio of 10:1). The first port throttle is closed as cylinder number one proceeds through its cylinder cycle and before another air charge is inducted into cylinder number one.

The third port throttle remains closed during the time period between $T_1$ and $T_3$. The air inlet throttle is also shown in a closed position and the desired cylinder IMEP stays at a high level so that the engine can be rapidly accelerated from cranking speed to idle speed.

At time $T_4$, the piston of cylinder number three approaches BDC and fuel injection to cylinder number three begins. Fuel injection into cylinder number three continues until time $T_5$. It can be noticed that the fuel supplied to cylinder number three is also distributed symmetrically about the time cylinder number three port pressure is at a minimum during the cylinder cycle. The third port throttle begins to open after fuel injection to cylinder number three ceases at time $T_5$. However, the third port throttle may begin to open earlier, but fuel vaporization may be reduced of the cylinder port throttle is opened during fuel injection. The third port throttle is opened less when the intake valve of cylinder number three closes at time $T_6$ as compared to the amount the first port throttle is opened when the intake valve of cylinder number one closes at time $T_3$. Consequently, the amount of air inducted to cylinder number three during its first combustion cycle is less than that of cylinder number one during its first combustion cycle. The amount of air and fuel allowed into cylinder number three is reduced based on the reduced desired IMEP. The IMEP is reduced so that engine speed does not overshoot the desired engine speed by a large amount. The third port throttle is closed before a subsequent combustion cycle begins.

Between time $T_6$ and time $T_7$, the engine accelerates and the engine rotates through additional cylinder cycles. As engine speed increases, the desired cylinder IMEP decreases so that engine speed does not overshoot the desired engine speed by more than a desired amount. The air inlet throttle also remains closed to that air in the engine intake manifold decreases.

At time $T_7$, the piston of cylinder number one is again approaching BDC of an intake stroke so start of fuel injection begins for the present cycle of cylinder number one. The fuel injection is again substantially centered about minimum cylinder port pressure (maximum cylinder port vacuum) during a cylinder cycle, and cylinder minimum port pressure correlates to cylinder minimum pressure. So, fuel injection can alternatively be centered about minimum cylinder pressure in this cycle as well as other cylinder cycles. Fuel injection to cylinder number one ceases at time $T_8$. Similar to during the first combustion cycle of cylinder number one, the first cylinder port throttle begins to open after fuel injection is ceased. The intake valve of cylinder number one closes at time $T_9$ and air flow into cylinder number one stops. As the engine accelerates the amount of time between cylinder strokes decreases. However, the amount of fuel injected to the cylinders decreases with decreasing desired cylinder IMEP. Therefore, the shorter time between cylinder cycles is at least somewhat counteracted by the shorter amount of time it takes to inject smaller amounts of fuel into the cylinders. Additionally, the first cylinder port throttle is opened less as compared to during the previous combustion cycle of cylinder number one to reduce cylinder IMEP and to achieve a desired cylinder air-fuel mixture.

Between times $T_{10}$-$T_{12}$, the piston of cylinder number three is again approaching BDC of an intake stroke so fuel is injected symmetrically about minimum cylinder port pressure intake stroke of cylinder number three. Additionally, the third cylinder port throttle position is adjusted to further reduce IMEP as the desired IMEP continues to decrease.

Between times $T_{13}$-$T_{18}$, pistons of cylinder numbers one and three again approach respective BDC locations of intake strokes so fuel is injected symmetrically about minimum cylinder port pressure during intake stroke of the cylinder. The first and third port throttles are also adjusted to reduce the IMEP of cylinders one and three. However, instead of closing again, the first and third cylinder port throttles are fully opened and air flows into the cylinders being regulated via the air inlet throttle. The air inlet throttle opens to allow air flow into the engine cylinders at a level that provides torque to achieve a desired engine speed. Engine speed continues to increase and eventually levels out to a desired engine speed.

In this way, fuel may be injected to engine cylinders during engine starting to promote fuel vaporization. Additionally, port throttles can be adjusted as shown to promote fuel vaporization and control cylinder air amount so that a desired IMEP may be achieved. In some examples, fuel injection timing may be adjusted to provide up to 25% more fuel on one side of minimum cylinder pressure or BDC intake stroke as compared to the other side of minimum cylinder pressure or BDC intake stroke.

For example, where the total amount of fuel injected to a cylinder during a cycle of the cylinder is $3.3 \times 10^{-2}$ grams, $2.48 \times 10^{-2}$ grams of fuel may be injected advanced of BDC intake stroke while $0.82 \times 10^{-2}$ grams of fuel may be injected retarded of BDC intake stroke during a cylinder cycle. Conversely, $2.48 \times 10^{-2}$ grams of fuel may be injected retarded of BDC intake stroke while $0.82 \times 10^{-2}$ grams of fuel may be injected advanced of BDC intake stroke during a cylinder cycle. Such an adjustment can allow for conditions where highest cylinder vacuum about BDC intake stroke may vary from BDC intake stroke.

FIG. 3 also shows that fuel is injected about minimum cylinder port pressure or BDC intake stroke for each engine cylinder for three combustion events since engine stop. However, fuel may be injected about minimum cylinder port pressure or BDC for a predetermined number of combustion events since engine stop that varies with engine operating conditions. Alternatively, fuel may be injected about minimum cylinder port pressure or BDC for the respective intake strokes of cylinders number one through four for a predetermined amount of time since engine stop. It should also be noted that fuel may be injected about minimum cylinder port pressure in a similar manner as injecting fuel about minimum cylinder port pressure as is shown in FIG. 3.

Referring now to FIG. 4, signals of interest during an engine start are shown. The signals of FIG. 4 are similar to those of FIG. 3. Further, similar signals are numbered similarly with the exception of the leading number of the identifier which follows the Fig. number. For example, signal 402 of FIG. 4 represents a position of a piston of cylinder number one and it follows the same trajectory of signal 302 in FIG. 3. Additionally, the time of vertical timing markers $T_0$ to $T_{18}$ are identical to similar timing events in FIG. 3. Therefore, for the sake of brevity, descriptions of common features are omitted and differences between the sequence of FIG. 3 and the sequence of FIG. 4 are described.

At times $T_{15}$ and $T_{18}$, the first and third port throttles are held open at a middle position away from the substantially closed position. Adjusting the port throttles to a middle position allows the port throttles to regulate air flow into the respective cylinders during the entire time the intake valves of the cylinders are open. For example, if the intake valve of cylinder number one is open from TDC intake stroke of cylinder number one to twenty degrees after BDC intake stroke of cylinder number one, the first port throttle regulates air to flow the first cylinder from TDC intake stroke of cylinder number one to twenty degrees after BDC intake stroke of cylinder number one. In this way, cylinder air flow may be regulated by the individual port throttles so that the air inlet throttle may be removed from the system.

Referring now to FIG. 5, a detailed view of a simulated example of engine fuel delivery to a cylinder and port throttle operation during a cycle of a cylinder are shown. The method of FIG. 7 executed by controller 12 in the system of FIG. 1 may provide the illustrated sequence.

The first plot from the top of FIG. 5 represents a trajectory of a piston in cylinder number one of a four cylinder, four stroke engine versus time. The piston is at top dead center when the trajectory is at the top of the sinusoid. The piston is at bottom dead center at the bottom of the sinusoid. Time begins at the left side of the plot and increases to the right side of the plot.

The second plot from the top of FIG. 5 represents fuel injection timing cylinder number one. A first fuel injection timing 502, a second fuel injection timing 504, and an optional third fuel injection 510 are shown versus time. The Y axis represents when fuel is being injected. A fuel injection above the X axis indicates that fuel is injected at the illustrated time. The X axis represents time and time begins at the left side of the plot and increases to the right side of the plot.

The third plot from the top of FIG. 5 represents position of a first port throttle that can regulate air flow to cylinder number one versus time. The Y axis represents port throttle opening amount and the port throttle opening amount increases in the direction of the Y axis arrow. The X axis represents time and time increases from the left side of the figure to the right side of the figure.

The fourth plot from the top of FIG. 5 represents cylinder number one port pressure versus time. The Y axis represents cylinder port pressure and cylinder port pressure increases in the direction of the Y axis arrow. The X axis represents time and time increases from the left side of the figure to the right side of the figure.

Pressure in the cylinder port decreases after the intake valve opens and the piston of the cylinder passes TDC intake stroke. The cylinder port pressure reaches minimum level at substantially BDC intake stroke. Injector pulse 504 begins injecting fuel before cylinder number one reaches minimum cylinder pressure near BDC intake stroke. Injector pulse 504 ends injecting fuel after cylinder number one reaches minimum cylinder pressure during the cylinder cycle after BDC intake stroke. Further, injector pulse 504 is positioned symmetrically about minimum cylinder pressure during the cylinder cycle so that the entire fuel pulse width experiences the lowest cylinder pressure during a cycle of the cylinder. In this way, as much injected fuel as possible may be exposed to a highest vacuum in a cylinder during a cycle of the cylinder. As such, fuel vaporization in the cylinder may be improved as compared to when fuel is simply injected during intake valve opening time.

On the other hand, fuel injection pulse 502 is shown starting to inject fuel advanced of when fuel injection pulse width 504 begins to inject fuel to the cylinder. In some examples, the timing of fuel injection pulse 502 may be advanced to the timing of fuel injection pulse 504 to account for the shallow slope of curve 200 during the intake stroke of the cylinder cycle as shown in FIG. 2. Further, fuel injection timing may be advanced as an engine warms and as fuel vaporization via vacuum may be less necessary. Advancing start of fuel injection timing to that of pulse 504 may improve cylinder air-fuel mixing. Thus, in some examples, fuel injection to a cylinder may begin at the timing of 504 and advance to the timing of 502.

FIG. 5 also shows that the first port throttle may begin to open shortly before fuel injection to cylinder number one ceases. Such operation of the first port throttle may be provided when the port throttle cannot open enough between the end of fuel injection and closing of the intake valve of cylinder number one to provide the cylinder a desired cylinder air amount. The pressure in the cylinder port increases as the first port throttle is opened. Opening the first port throttle allows pressure in the cylinder port to approach intake manifold pressure. In this way, most of the air entering cylinder number one occurs between the opening time of the first port throttle and the closing time of the intake valve of cylinder number one. Thus, the first port throttle and the cylinder intake valve control air flow to cylinder number one.

The second fuel pulse 510 may be injected late in the compression stroke of the cylinder to take advantage of cylinder heating through compression work. When fuel is injected late during the compression stroke (e.g., within 45 crankshaft degrees of TDC compression stroke) heat of compression may further assist fuel vaporization and mixing. Thus, a first injection may leverage vacuum in the cylinder while a second injection leverages heat in the cylinder. Consequently, fuel vaporization may be enhanced in two separate injection modes (e.g., vacuum enhanced vaporization and heat enhanced vaporization) during a cylinder cycle.

Referring now to FIG. 6, the signals of FIG. 6 are identical to the cylinders of FIG. 5 with the exception of fuel pulses 602 and 604. Therefore, the description of redundant elements is omitted and differences between FIGS. 5 and 6 are described.

In this example, a total amount of fuel injected to cylinder number one is comprised of two fuel pulse widths 602 and 604. Additionally, an optional third fuel pulse 610 may be provided to utilize heat of compression. In some examples, fuel pulse width 602 may be advanced while fuel pulse 604 may remain near minimum cylinder pressure or near BDC intake stroke as the engine begins to warm after starting. Thus, the timing of when the two fuel pulse widths are injected may initially be symmetric about minimum cylinder pressure (e.g., maximum cylinder vacuum) during a cylinder cycle or BDC intake stroke of a cylinder, and as the engine warms, the timing of the two fuel pulses may be come asymmetric. The third fuel pulse 610 may utilize compression heat to vaporize additional fuel injected to the cylinder.

Figure 7:
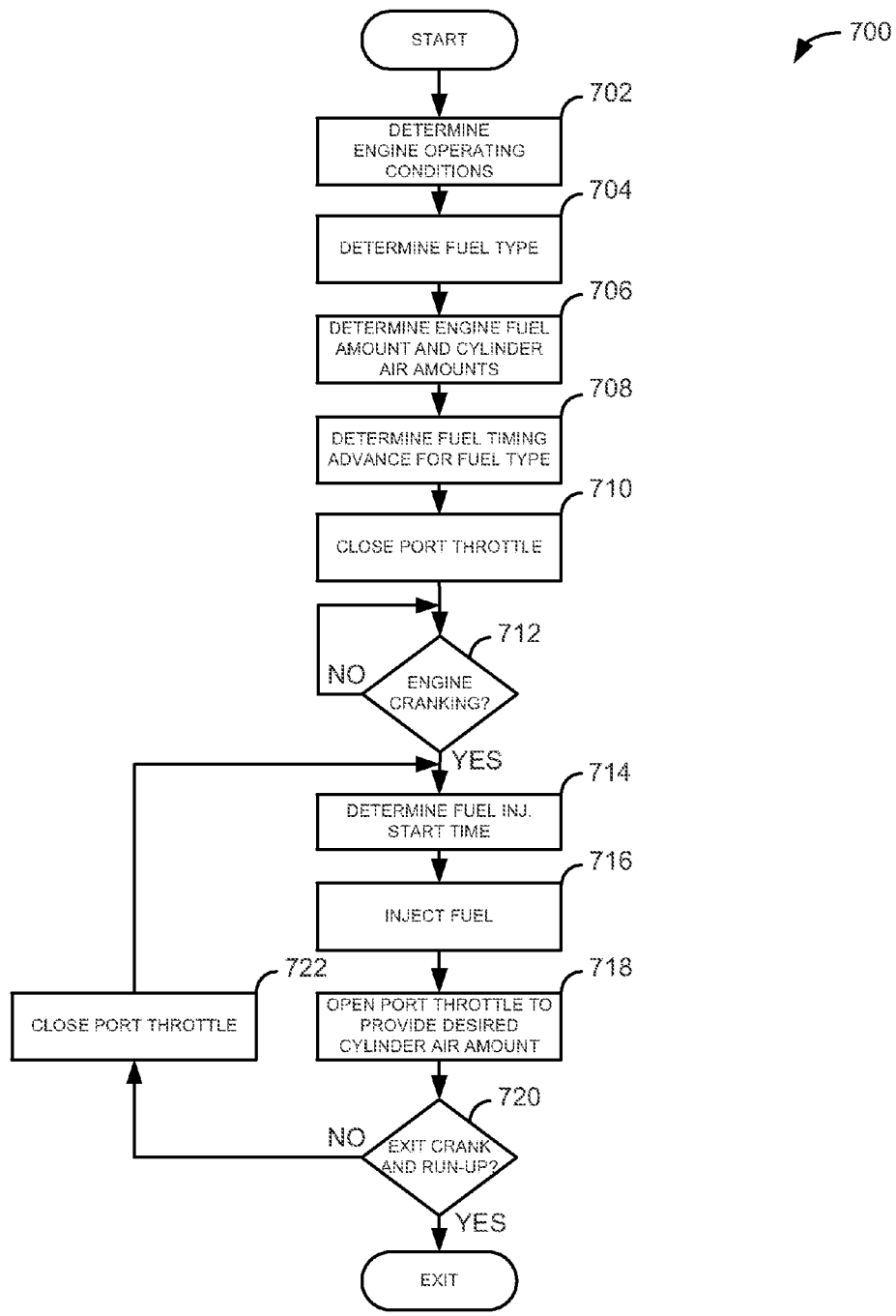
FIG. 7 shows a flowchart of an example method for starting an engine.

Referring now to FIG. 7, a flowchart of an example method for starting an engine is shown. The method of FIG. 7 may be included in instructions of controller 12 shown in the system of FIG. 1.

At 702, method 700 determines engine operating conditions. Engine operating conditions may include but are not limited to engine speed, engine temperature, barometric pressure, engine position, time since engine stop, and combustion events since engine stop. Method 700 proceeds to 704 after engine operating conditions are determined.

At 704, method 700 determines the type of fuel to be injected to the engine. In one example, the fuel type may be determined via a fuel type sensor. In other examples, the fuel type may be inferred from an oxygen sensor and stored in memory. For example, the method described in U.S. Pat. No. 6,644,097 which is hereby fully incorporated by reference may be the basis for determining fuel type. Once the fuel type is determined, it may be stored in controller memory and stored for subsequent retrieval.

At 706, method 700 determines an amount of fuel to inject to the engine and amounts of air to induct into engine cylinders. In one example, the amount of fuel injected to the engine and cylinder air amounts may be based on an engine torque request and the fuel type at time of engine start. For example, desired engine torque or cylinder pressure (e.g., IMEP) at engine starting may empirically determined and stored in memory. Upon an engine start request, the engine torque amount or cylinder pressure may be retrieved from memory. The engine torque or cylinder pressure may be converted to a cylinder air amount and fuel amount according to the method described in U.S. Pat. No. 7,321,821 which is hereby incorporated by reference for all intents and purposes. Where different fuels may be combusted by the engine, a multiplication factor may be used to adjust the amount of fuel injected so that the desired engine torque is provided by different fuel types. Method 700 proceeds to 708 after fuel amount and cylinder air amounts are determined.

At 708, method 700 determines an amount of advance to adjust fuel injection start of injection timing. In other words, method 700 determines how much earlier in time or crankshaft position to adjust fuel injector start of injection from base fuel injection timing. In one example, fuel injector advance is empirically determined and stored in tables or functions that may be indexed via engine temperature and number of combustion event from engine stop time. Thus, as the engine warms the fuel injection timing may be advanced.

In some examples, the amount of time fuel injection is advanced relative to crankshaft position may be based on fuel type. For example, if gasoline is injected to a cylinder, the fuel injection start of injection time may be advance further than a fuel that contains alcohol. As the alcohol content of the fuel increases, the start of injection time moves closer to base fuel injection timing. In one example, base start if injection timing is based on 100% ethanol fuel. Method 700 proceeds to 710 after fuel injector timing advance is determined.

At 710, method 700 closes the cylinder port throttles. The cylinder port throttles may be independently controlled such that some cylinder port throttles may be partially open while others are substantially closed. Closing the cylinder port throttle allows additional vacuum to be generated in engine cylinders as compared to vacuum in the engine intake manifold. Method 700 proceeds to 712 after the engine port throttles are closed.

At 712, method 700 judges whether or not the engine is cranking or rotating via a starter or a motor. In one example, method 700 judges that the engine is cranking when engine speed is greater than a threshold speed. Method 700 proceeds to 714 if it is judged that the engine is cranking Otherwise, method 700 returns to 712.

At 714, the fuel injection timing is determined. In one example, the amount of time it takes to inject a desired amount of fuel to a cylinder is determined via a transfer function of a fuel injector. For example, a desired fuel amount is used to index a table or function that describes injector operation. The table or function outputs a time to open the injector to deliver the desired amount of fuel at the present fuel pressure (e.g., 40 ms). The time to inject the fuel is divided by two, and fuel injection to a cylinder commences 20 ms before the cylinder reaches minimum pressure during a cycle of the cylinder or when the piston is substantially at BDC so that the entire pulse width of 40 ms is symmetrically distributed in time and relative to minimum cylinder pressure or crankshaft position about BDC intake stroke of the cylinder receiving the fuel. The start of injection timing may be converted to a crankshaft angle relative to minimum cylinder pressure or BDC intake stroke of the cylinder receiving the fuel since start of injection time may be correlated to an engine position (e.g., BDC intake stroke of a cylinder). For example, for an engine that has a cranking speed of 250 RPM, start of fuel injection may begin 30 crankshaft degrees before BDC intake stroke of the cylinder receiving fuel when the total fuel injection time is 40 ms. Since it takes the engine 20 ms to rotate 30 crankshaft degrees (e.g., 30 deg=20 ms·250 RPM·360 deg/rev·1s/1000 ms·1 min/60 sec), the fuel is delivered substantially about BDC intake stroke of the cylinder. If fuel injection time is to be advanced from base timing, the advance amount determined at 708 is added to the start of fuel injection timing to further advance fuel injection timing. In this way, fuel injector timing may be determined. Method 700 proceeds to 716 after fuel injection timing is determined.

At 716, method 700 injects fuel to the engine at the prescribed timing via opening a fuel injector. The fuel injector may be opened at a crankshaft angle as determined at 714 for the amount of time determined at 706. Optionally, an additional fuel injection may commence late in the compression stroke during a cylinder cycle to utilize compression heating. Thus, a portion of injected fuel may be vaporized via vacuum while the remainder of injected fuel may be vaporized utilizing compression heat. Method 700 proceeds to 718 after fuel injection timing is output.

At 718, method 700 opens a cylinder port throttle to provide a desired air amount to the cylinder as described at 706. In one example, the flow air flow through the cylinder port throttle may be described by a function or table that relates pressure drop across the cylinder port throttle and port throttle position to air flow through the port throttle. Further, the amount of time to fully open the cylinder port throttle may be empirically determined and stored in memory. Based on the maximum cylinder port throttle opening rate and the cylinder port throttle flow description, the flow through the throttle is integrated such that an amount of time it takes to flow the desired air amount through the port throttle is determined. The cylinder port throttle is opened the determined amount of time before the intake valve of the cylinder is closed. In some examples, an offset to account for valve lift and engine speed effects may be added to the time determined to flow the desired air amount through the cylinder port throttle. The cylinder port throttle is opened, for the cylinder receiving the fuel, the amount of time it takes to flow the desired cylinder air amount through the port throttle before the intake valve closes. For example, if it is determined that it takes 25 ms to flow a desired air amount through a cylinder port throttle, the cylinder port throttle is opened 25 ms before the intake valve closes. Method 700 proceeds to 720 after the cylinder port throttle is scheduled and output.

At 720, method 700 judges whether or not the engine has exited crank and run-up. In one example, it may be judged that the engine has exited crank and run-up when engine speed exceeds a threshold engine speed. If the engine has exited crank and run-up method 700 proceeds to exit. If the engine includes an air inlet throttle, the cylinder port throttles may transition to a fully open position upon exiting method 700. If the engine does not include an air inlet throttle, the cylinder port throttles may transition to a partially open position such that the engine operates at a desired engine idle speed.

Alternatively, method 700 may exit after a predetermined number of combustion events have occurred or if some other engine condition such as a desired engine temperature or desired engine speed is reached. In this way, an engine controller may inject fuel to a cylinder symmetrically about maximum cylinder vacuum (minimum cylinder pressure) or BDC intake stroke of the cylinder and then transition to a different fuel injection mode.

At 722, method 700 substantially closes a cylinder port throttle after the desired amount of air has passed through the cylinder port throttle and into the cylinder. Further, the cylinder air amount and cylinder fuel amount determined at 706 may be revised based on present engine operating conditions (e.g., number of combustion events since engine stop, engine temperature, time since engine stop) as described at 706. Method 700 returns to 714 after the cylinder port throttle is closed.

In this way, method 700 may operate fuel injectors and cylinder port throttles as illustrated in FIGS. 3-6. Method 700 may execute for each cylinder of an engine so that all cylinder port throttles and fuel injectors may be controlled to provide desired cylinder fuel and air amounts.

Referring now to FIG. 8, signals of interest during an engine start are shown. The signals of FIG. 8 are similar to those of FIGS. 3 and 4. Further, similar signals are numbered similarly with the exception of the leading number of the identifier which follows the Fig. number. For example, signal 802 of FIG. 8 represents a position of a piston of cylinder number one and it follows the same trajectory of signal 302 in FIG. 3. Additionally, the time of vertical timing markers $T_0$ to $T_{18}$ are identical to similar timing events in FIG. 3. Therefore, for the sake of brevity, descriptions of common features are omitted and differences between the sequence of FIG. 3 and the sequence of FIG. 8 are described.

In the example sequence of FIG. 8, cylinder port throttles are mechanically coupled together so that when cylinder number one port throttle is moved, cylinder number three port throttle also moves. The port throttles are also at similar positions. For example, when cylinder number three port throttle is closed, cylinder number one port throttle is closed.

Cylinder port throttles for cylinders number one and three are substantially closed at time $T_0$ and open after time $T_{18}$. The cylinder port throttles may be opened together based on when intake manifold pressure is reduced to a predetermined pressure, after a predetermined number of induction events or combustion events from engine stop, or after engine speed reaches a predetermined threshold speed.

Fuel is injected to each cylinder such that the fuel pulse is substantially centered about minimum cylinder port pressure (e.g., maximum cylinder port vacuum) or BDC intake stroke of the cylinder. Alternatively, the fuel injection interval may be substantially centered or slightly advance from maximum cylinder vacuum or within the time when cylinder volume is within 20% of maximum cylinder volume during the cylinder intake stroke.

In this way, an engine having port throttles that are mechanically coupled together may be operated during an engine start. Operating a plurality of port throttles together via a single actuator may reduce system cost.

Since the port throttles only control air pressure at the injection and air charge during the intake stroke and the compression stroke until IVC, port throttles for multiple cylinders can share a shaft (and thus position) without sacrificing the feature originally described with independent port throttles between cylinders. This is because for nearly 3/4 of all engine positions, the port throttle position is "don't care", meaning, a single port throttle's position is not controlling air and fuel charging during that angular portion.

Referring now to FIG. 9, a flowchart of a method for starting an engine is shown. The method of FIG. 9 is applicable to engine systems that include port throttle that are mechanically coupled together. The operations of FIG. 9 are similar to those of FIG. 7. Further, similar operations are numbered and labeled similarly with the exception of the leading number of the identifier which follows the FIG. number. For example, engine operating conditions are determined at 902 of FIG. 9 while engine operating conditions are determined at 702 of FIG. 7. Therefore, for the sake of brevity, descriptions of common operations are omitted and differences between operations of FIG. 7 and the method of FIG. 9 are described.

At 910, method 900 adjusts the position of cylinder port throttles of a cylinder bank to a position for cranking The port throttle position during cranking may be empirically determined and adjusted for barometric pressure. For example, a function that describes port throttle position based on barometric pressure may be indexed via barometric pressure to determine a desired cylinder port throttle position. The desired cylinder port throttle may be commanded before engine cranking begins. Method 900 proceeds to 912 once the position of cylinder port throttles is set.

At 918, the position of cylinder port throttles may be adjusted. In one example, the position of port throttles may be adjusted during engine cranking based on the number of cylinder air induction events or number of combustion events since engine stop. For example, after a first induction event the cylinder port throttle may be opened further since pressure in the intake manifold may be reduced as air is transferred from the intake manifold to an engine cylinder. In this way, uniform cylinder air amounts may be provided for several cylinder air induction events if desired. In other examples, the cylinder port throttle positions may be held at a constant state during engine cranking At 920, method 900 judges whether or not to exit crank and run-up. In one example, method 900 may exit crank and run-up mode when engine speed exceeds a threshold engine speed. In another example, method 900 may exit crank and run-up mode when intake manifold pressure is reduced to a level less than a threshold pressure. In still another example, method 900 may exit crank and run-up mode after a predetermined number of cylinder combustion events. If method 900 exits crank and run-up, method 900 proceeds to 922. Otherwise, method 900 returns to 914.

At 922, method 900 opens cylinder port throttle to a fully open position. By opening the cylinder port throttles to a fully open position, method 900 allows air flowing into engine cylinders to be regulated by the air inlet throttle and cylinder intake valves. Method 900 proceeds to exit after the cylinder port throttles are opened.

Thus, the methods of FIGS. 7 and 9 provides for a method of starting an engine, comprising: substantially closing a port throttle of a cylinder; and injecting at least a portion of an amount of fuel to a cylinder during a cylinder cycle while the port throttle is substantially closed, the amount of fuel injected being during an interval that includes a middle position which is substantially aligned with bottom dead center intake stroke of the cylinder. By aligning the fuel pulse with BDC intake stroke of the cylinder the possibility of fuel vaporization may be increased.

The method includes where the amount of fuel is directly injected to the cylinder. The method also includes where the interval is a time interval or where the interval is a crankshaft interval. In some examples, the method includes where the engine has an air inlet throttle and where a fuel comprising alcohol is injected to the cylinder during the interval. The method also includes where the amount of fuel is injected to the cylinder in two or more fuel pulses. The method further comprises at least partially opening the port throttle after a start of fuel injection timing.

The methods of FIGS. 7 and 9 also provides for starting an engine, comprising: substantially closing a port throttle of a cylinder during a cylinder cycle; at least partially opening the port throttle during the cylinder cycle after substantially closing the port throttle and after beginning to inject a fuel to the cylinder during the cylinder cycle; and substantially closing the port throttle after an intake valve of the cylinder closes. The method also includes where the fuel is injected having a start of injection timing that varies with alcohol content of the fuel. In some examples, the method includes where the fuel is port injected.

The method may also include where the port throttle is opened at a time that is based on a desired cylinder air amount. The method further comprises injecting a fuel to the cylinder during an interval during the cylinder cycle, where the interval is substantially centered about bottom dead center intake stroke of the cylinder. The method also includes where the fuel is injected in two or more fuel pulses. The method further comprises advancing start of injection timing of the interval in response to a type of fuel injected to the cylinder and where the interval is not substantially centered about bottom dead center intake stroke of the cylinder when gasoline without alcohol is injected to the cylinder. The method also includes where at least partially opening the port throttle includes increasing an opening amount of the port throttle as a desired cylinder air amount increases.

As will be appreciated by one of ordinary skill in the art, the method described in FIGS. 7 and 9 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method of starting an engine, comprising:
substantially closing a cylinder port throttle; and
directly injecting an amount of fuel to a cylinder during a cylinder cycle while cylinder vacuum varies with engine rotation and while the cylinder port throttle is substantially closed during engine cranking, the amount of fuel injected being during an interval that includes a middle position which is substantially aligned with a predetermined cylinder vacuum level.

2. The method of claim 1, wherein the engine is started from a stopped position.

3. The method of claim 1, further comprising determining a desired amount of air based on a desired IMEP, the method further comprising opening the cylinder port throttle after the amount of fuel is injected.

4. The method of claim 1, where the interval is a time interval or where the interval is a crankshaft interval, and where the predetermined vacuum level substantially corresponds to a position of bottom dead center intake stroke of the cylinder.

5. The method of claim 1, where the amount of fuel is injected to the cylinder in two or more fuel pulses.

6. The method of claim 1, further comprising at least partially opening the cylinder port throttle after a start of fuel injection timing, and where the amount of fuel is injected to the cylinder via a cylinder port.

7. The method of claim 1, where the predetermined cylinder vacuum level is a minimum vacuum level of the cylinder, and where the cylinder port throttle is located upstream of a poppet valve.

8. The method of claim 7, where the engine includes an air inlet throttle and where a fuel comprising alcohol is injected to the cylinder during the interval, and where the predetermined vacuum level is estimated via a position of the engine.

9. A method of starting an engine, comprising:
substantially closing a port throttle of a cylinder during a cylinder cycle of engine cranking;
at least partially opening the port throttle before closing an intake valve of the cylinder during the cylinder cycle after substantially closing the port throttle and after beginning to inject a fuel to the cylinder during the cylinder cycle; and
substantially closing the port throttle after the intake valve of the cylinder closes.

10. The method of claim 9, where the fuel is injected having a start of injection timing that varies with alcohol content of the fuel.

11. The method of claim 9, where the fuel is port injected; and where the port throttle is opened at a time that is based on a desired cylinder air amount, and where air flow into the cylinder is limited via an intake valve of the cylinder closing after the port throttle opens and before the port throttle closes.

12. The method of claim 9, further comprising injecting the fuel to the cylinder within an interval during the cylinder cycle, where the interval is substantially centered about a predetermined vacuum level of the cylinder as the engine rotates.

13. The method of claim 12, where the fuel is injected in two or more fuel pulses, and where the predetermined vacuum level is substantially located about bottom dead center intake stroke of the cylinder.

14. The method of claim 12, further comprising advancing start of injection timing of the interval in response to a type of fuel injected to the cylinder, and where the interval is not substantially centered about bottom dead center intake stroke of the cylinder when gasoline without alcohol is injected to the cylinder.

15. The method of claim 9, where at least partially opening the port throttle includes increasing an opening amount of the port throttle as a desired cylinder air amount increases.

16. A system for controlling an engine, comprising:
an engine air intake throttle located along an engine air intake passage;
a first engine cylinder port throttle located along the engine air intake passage downstream of the engine air intake throttle and upstream of a poppet valve;
a first fuel injector located downstream of the first engine cylinder port throttle and coupled to the engine to directly inject fuel;
a cylinder receiving a fuel via the first fuel injector and air via the first engine cylinder port throttle; and
a controller including instructions for selecting a cylinder vacuum level where a substantially same amount of fuel is injected to the cylinder before and after the cylinder vacuum level is reached during a cycle of the cylinder as the engine rotates, and including additional instructions for opening the first engine cylinder port throttle after the first fuel injector begins to inject fuel during the cycle of the cylinder.

17. The system of claim 16, further comprising a second engine cylinder port throttle, and further comprising additional instructions for adjusting the second engine cylinder port throttle independent of the first engine cylinder port throttle.

18. The system of claim 16, further comprising additional instructions for substantially fully opening the first engine cylinder port throttle after the engine reaches a predetermined engine speed.

19. The system of claim 16, where the same amount of fuel injected to the cylinder before and after the predetermined vacuum level is reached is injected in two separate pulses.

20. The system of claim 16, further comprising additional instructions for substantially closing the first engine cylinder port throttle after an intake valve of the cylinder is closed during the cycle of the cylinder.

* * * * *